US006282952B1

(12) United States Patent
Kawolics

(10) Patent No.: US 6,282,952 B1
(45) Date of Patent: Sep. 4, 2001

(54) SHIELD FOR A SIGHT GAUGE

(75) Inventor: Raymond P. Kawolics, Solon, OH (US)

(73) Assignee: The Meyer Company, Cleveland, OH (US)

( * ) Notice: Subject to any disclaimer, the term of this patent is extended or adjusted under 35 U.S.C. 154(b) by 0 days.

(21) Appl. No.: 09/143,771

(22) Filed: Aug. 31, 1998

Related U.S. Application Data

(60) Provisional application No. 60/057,508, filed on Sep. 4, 1997.

(51) Int. Cl.[7] ........ G01F 23/02

(52) U.S. Cl. ........ 73/325; 73/323; 73/326

(58) Field of Search ........ 73/323, 325, 326, 73/328, 329, 330, 332, 333; 99/285, 342, 343; 126/219

(56) References Cited

U.S. PATENT DOCUMENTS

| | | | |
|---|---|---|---|
| 535,449 | 3/1895 | Lunken | 73/325 |
| 745,744 | 12/1903 | Uhalt | 73/325 |
| 955,175 | 4/1910 | Lomax | 73/325 |
| 1,157,805 | 10/1915 | Ray . | |
| 1,186,260 | 6/1916 | Wood | 73/323 |
| 1,225,604 | 5/1917 | Ernst | 73/326 |
| 1,349,236 | 8/1920 | Strohbach . | |

FOREIGN PATENT DOCUMENTS

| | | | |
|---|---|---|---|
| 6642/27 | 3/1927 | (AU) | 73/325 |
| 70066 | 4/1892 | (DE) . | |
| 297213 | 6/1914 | (DE) . | |

*Primary Examiner*—Hezron Williams
*Assistant Examiner*—Michael Cygan
(74) *Attorney, Agent, or Firm*—Fay, Sharpe, Fagan, Minnich & McKee, LLP

(57) ABSTRACT

A sight gauge assembly for an urn sight gauge includes an elongated extruded sight gauge shield. The shield has a longitudinal axis and a generally U-shaped cross section defining the shield to have a sight gauge receiving recess extending along its entire length. The recess is defined by an arcuate inner surface terminated on opposite ends by first and second edges, respectively, so that an open sight gauge viewing region is provided between the edges. A tubular sight gauge is placed in the recess of the extruded sight gauge shield, and the arcuate inner surface of the recess conforms to a portion of a curved outer surface of the tubular sight gauge. An end cap is fixedly secured to a first end of the sight gauge shield and the assembly includes means for operatively connecting it to an associated faucet. The extruded shield includes collars positioned around first and second ends thereof to limit radially expansion of the member when an end cap is secured to the first end and when a nipple is secured to the second end.

1 Claim, 5 Drawing Sheets

30
50
60
12
14
10
52
42
40

SHIELD FOR A SIGHT GAUGE

CROSS-REFERENCE TO RELATED APPLICATION

This application claims priority from U.S. Provisional Application Ser. No. 60/057,508, filed Sep. 4, 1997.

BACKGROUND OF THE INVENTION

The present invention relates to shields for sight gauges. It finds particular application in connection with the protection of sight glasses or gauges used in association with urns containing coffee or other liquids that are to be dispensed through an associated faucet.

Sight gauges for urns and the like are used to indicate the level of liquid in the urn and are provided in the form of an elongated tubular glass member in fluid communication with the urn and secured adjacent an outer wall thereof in a vertical orientation for convenient operator viewing. The glass tube is surrounded by a cylindrical protective metal shield or sleeve which prevents breakage of the sight gauge during shipping, assembly, cleaning, and other inadvertent contact during normal liquid dispensing operations.

To permit viewing of the sight gauge, prior gauge shields have included at least one slot formed through a wall thereof by a milling operation and extending vertically along a portion of the gauge shield. The milling operation and associated gauge shield metal polishing step are costly and time-consuming. Thus, it would be desirable to provide a gauge shield which adequately protects the sight gauge in a cost-effective manner, which is easy to manufacture and assemble, and which facilitates easy gauge reading.

SUMMARY OF THE INVENTION

In accordance with the present invention, a new and improved sight gauge shield is provided.

In accordance with a first aspect of the present invention, a sight gauge assembly for an urn includes an elongated extruded sight gauge shield having a longitudinal axis and a generally U-shaped cross section defining the sight gauge to have a sight gauge receiving recess. The recess is defined by an arcuate inner surface terminated on opposite ends thereof by first and second edges, respectively, so that an open sight gauge viewing region is provided between the edges. A tubular sight gauge is placed in the recess of the extruded sight gauge shield and the arcuate inner surface of the recess conforms to a portion of a curved outer surface of the tubular sight gauge. An end cap is fixedly secured to a first end of the sight gauge shield. The assembly includes means for operatively connecting the extruded sight gauge shield to an associated faucet.

In accordance with another aspect of the present invention, a sight gauge shield for liquid-containing urn includes a metallic extrusion having an elongated generally U-shaped profile including a recess defined therein from a first end to a second end and adapted for receiving a tubular sight gauge therein. The recess is defined by an arcuate surface terminated on opposite ends by first and second edges, respectively, so that an open sight gauge viewing region is provided between the first and second edges opposite the arcuate surface.

In accordance with still another aspect of the present invention, an extruded sight gauge shield for an urn includes an elongated member including a first end, a second end, and an elongated open channel defined therein and extending entirely from the first end to the second end. The open channel is adapted for receiving a sight gauge therein. The shield includes means selectively attached to the first end of the extruded member for blocking the first end of the channel and means for securing the second end of the elongated member to a liquid-dispensing faucet.

In accordance with still another aspect of the present invention, a method of forming a sight gauge shield for attachment to an urn includes extruding a member having a first end, a second end, and a continuous generally U-shaped recess defined therein. The recess is defined by an arcuate inner surface terminated at opposite circumferential ends by first and second edges, respectively, so that an open viewing region is defined in the extruded member between the first and second edges. Threads are formed in the arcuate inner surface at the first and second ends of the extruded member and first and second collars are fitted about the extruded member at the first and second ends to limit radial expansion of the extruded member. An end cap is threadably secured to the first end of the extruded member using the threads formed in the inner surface at the member first end and a faucet attachment nipple is threadably secured to the second end of the extruded member using the threads formed in the inner surface at the member second end.

A first advantage of the present invention resides in the provision of a low cost and highly effective sight gauge shield.

Another advantage of the present invention is found in the provision of a sight gauge shield which is convenient and simple to manufacture and assemble.

A further advantage of the present invention is the provision of a gauge shield adapted for securing a graduated sight gauge level indicator card in association with a sight gauge.

Another advantage of the present invention is that it allows for convenient and secure threaded connection of a cap at a first end and a faucet attachment nipple at a second end by preventing radial expansion of the shield.

Still other objects, features, and advantages of the present invention will become apparent to those of ordinary skill in the art upon reading and understanding the present application in conjunction with the drawings.

BRIEF DESCRIPTION OF THE DRAWINGS

The invention may take physical form in certain parts and arrangements of parts, preferred embodiments of which are described in detail herein and illustrated in the accompanying drawings which form a part hereof and wherein.

DETAILED DESCRIPTION OF THE PREFERRED EMBODIMENT

Figure 1:
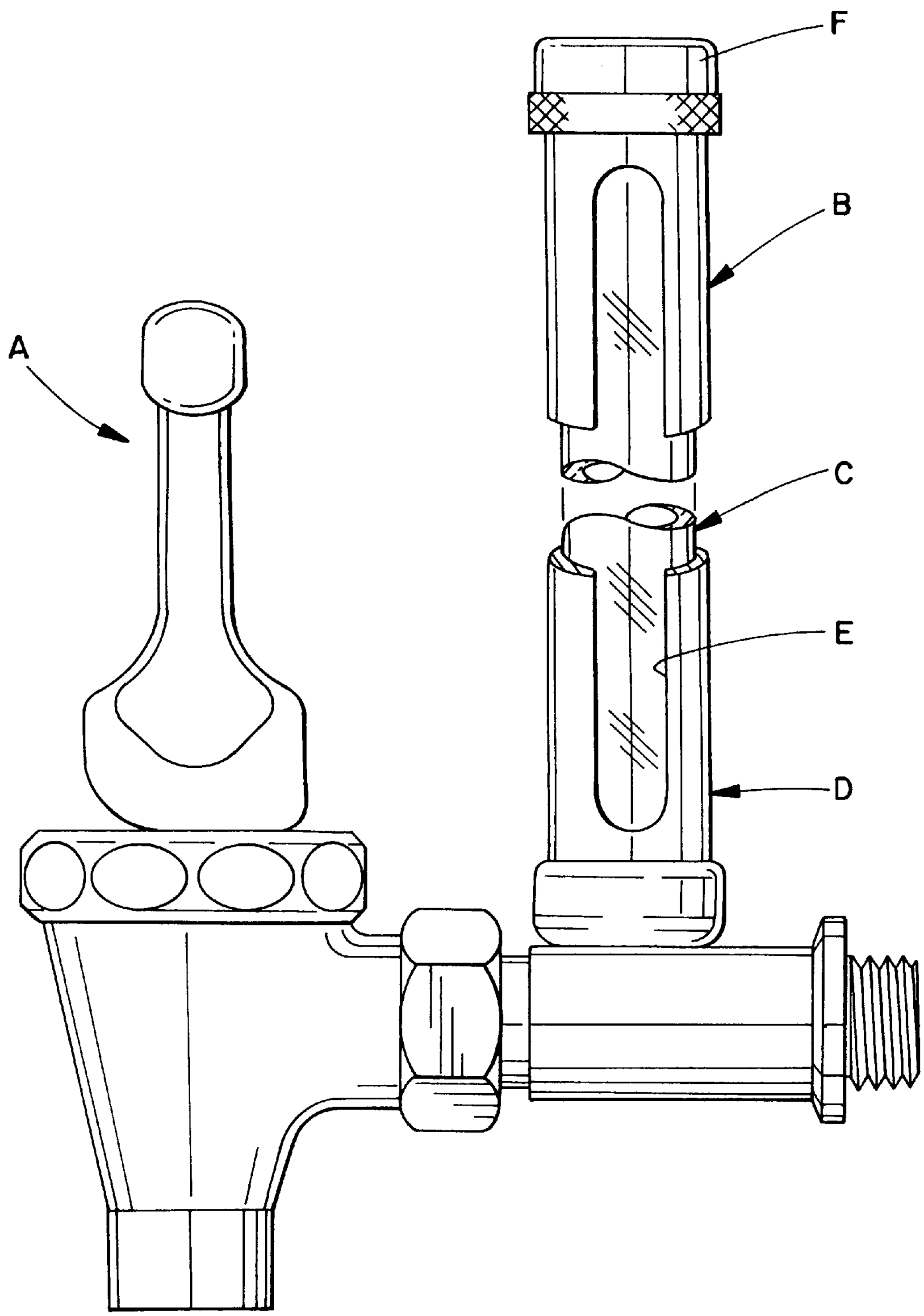
FIG. 1 is a side-elevational view of a known gauge shield and an associated faucet.

FIG. 1 illustrates a conventional faucet assembly A for connection to an urn or the like for dispensing liquids such as coffee therefrom. The faucet assembly A includes a conventional sight gauge assembly B having an elongated tubular sight gauge or glass C surrounded by a cylindrical protective metallic gauge shield D. The shield D includes at least one elongated viewing slot E formed therethrough by a milling operation to permit viewing of the liquid level in the sight glass C. The shield D includes circumferentially extending external threads at the ends thereof for connection of an end cap and for the shield's connection to a faucet body, respectively. The step of milling a viewing slot E in the gauge shield D and the associated polishing operation are time-consuming, and thus, expensive.

Figure 2A:
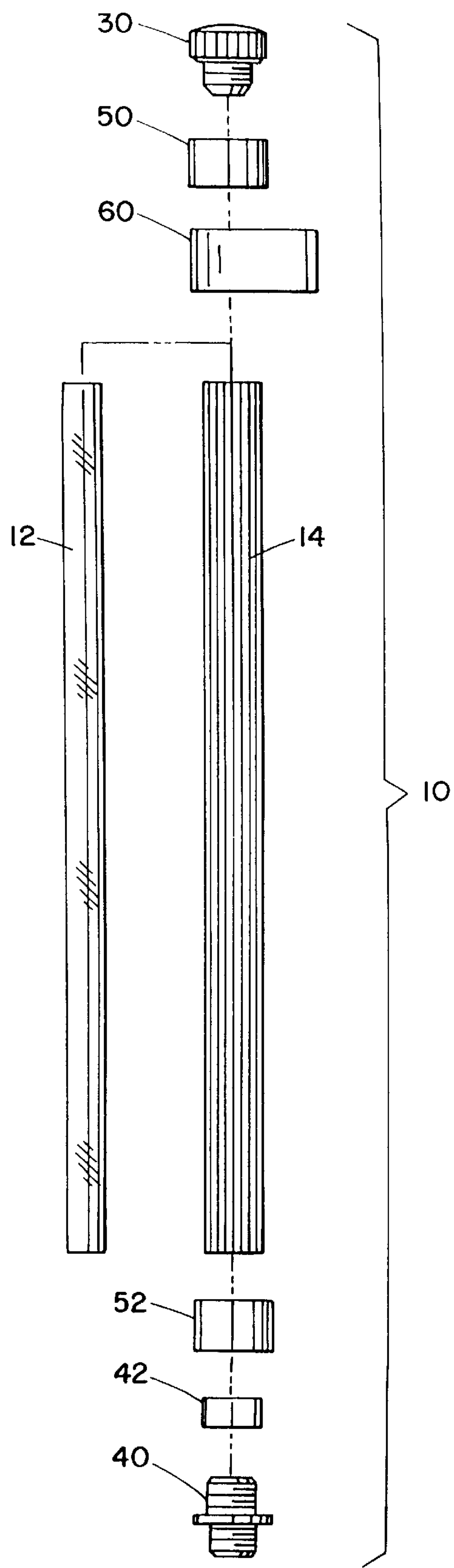
FIG. 2A is an exploded view of a gauge shield assembly in accordance with the present invention.
Figure 2B:
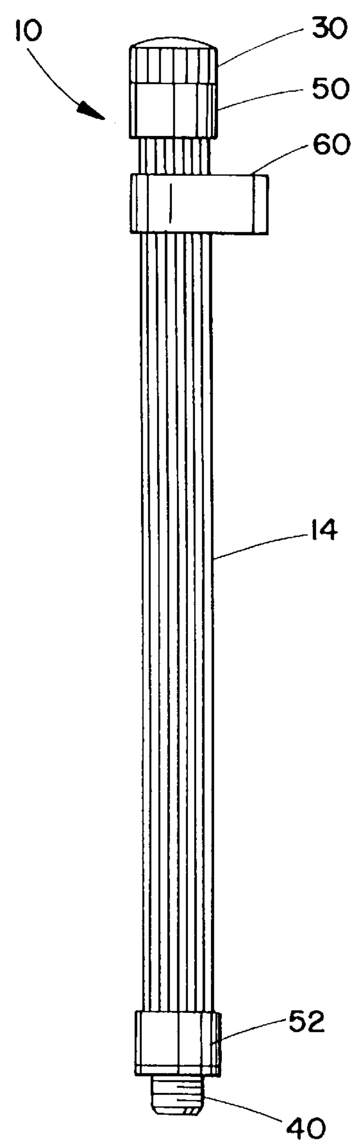
FIG. 2B is a side elevational view of the gauge shield assembly of FIG. 2A in its assembled state.

Referring now to FIGS. 2A and 2B, a gauge shield assembly in accordance with the present invention is shown generally at 10. The assembly 10 includes a tubular sight gauge 12 made of glass or plastic which is surrounded by an extruded metal gauge shield 14. Preferably, the gauge shield 14 is made from extruded 6063T6 aluminum alloy or a similar alloy, although those of ordinary skill in the art will recognize that other materials may be used for the extruded gauge shield 14 without departing from the overall scope and intent of the present invention.

Figures 3, 4:
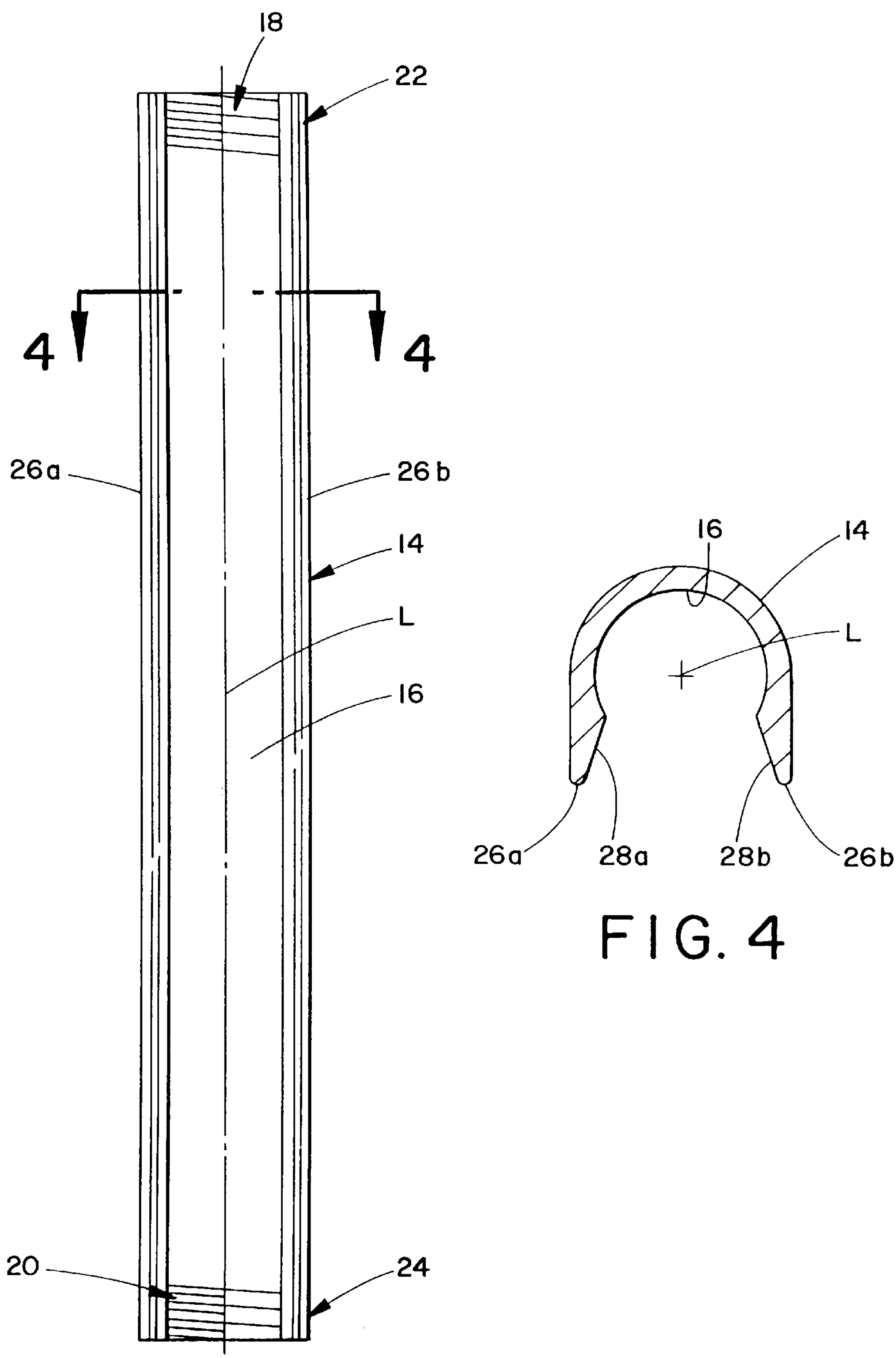
FIG. 3 is a front plan view of a gauge shield in accordance with the present invention.
FIG. 4 is a view along line 4—4 of FIG. 3.

With reference also to FIGS. 3 and 4, the extruded gauge shield 14 is generally U-shaped in cross-section or profile about a longitudinal axis L to define a recess 15 that receives the sight gauge 12 so that an arcuate inner surface 16 of the shield 14 conforms with an adjacent portion of the outer surface of the tubular sight gauge 12. The U-shaped shield 14 allows a sight gauge 12 housed in the recess 15 to be viewed along its entire length without requiring any viewing slots to be milled or otherwise formed through the shield 14. Because the shield 14 is an extruded member, the recess 15 extends uniformly along the entire length of the shield 14. Preferably, the arcuate inner surface 16 extends through at least 180° (but less than 360° ) about the axis L to facilitate the formation of threads 18,20 therein at opposite shield ends 22,24, respectively.

The extruded shield 14 includes first and second axially extending edges 26*a*, 26*b* that protrude away from the surface 16 to provide further protection for a sight gauge 12 housed in the shield 14. The edges 26*a*, 26*b* respectively include chamfered surfaces 28*a*, 28*b* that diverge relative to each other in a direction away from the inner surface 16 to allow for wider angle viewing of the housed sight gauge 12 through the open region defined between the edges 26*a*, 26*b* that terminate the surface 16 on its opposite ends. The gauge viewing space defined between the edges 26*a*, 26*b* is preferably smaller than the diameter of the sight gauge 12 so that the gauge 12 cannot pass therethrough. Instead, the gauge 12 is axially inserted into the shield 14 through either the upper or lower open ends 22,24 thereof.

Figure 5:
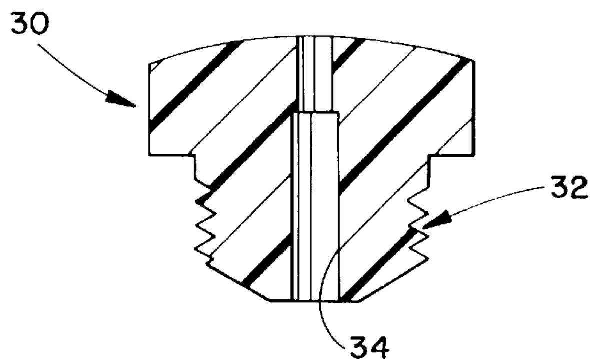
FIG. 5 is a cross-sectional view of an end cap of a gauge shield in accordance with the present invention.

An end cap 30 (FIG. 5) includes external threads 32 for mating with the internal threads 18 at the first end 22 of the shield 14. The end cap 30 prevents the sight gauge 12 from sliding out of the open upper end 22 of the shield 14 and also substantially blocks an open upper end of the tubular sight gauge 12. The cap 30 includes a vent passage 34 formed therethrough that permits the proper operation of the sight gauge. The internal threads 20 at the second end 24 of the shield mate with a nipple 40 that connects the shield 14 and the sight gauge 12 to an urn faucet body so that the sight gauge 12 is in fluid communication with the faucet. A washer or gasket 42 is provided between the nipple and the sight gauge 12.

Figure 6:
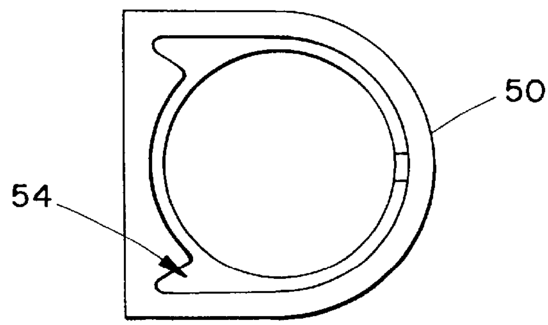
FIG. 6 is a plan view of a gauge shield collar in accordance with the present invention.
Figure 7:
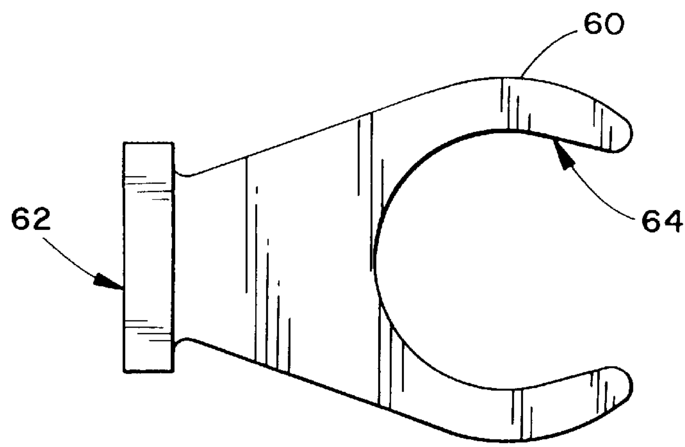
FIG. 7 is a plan view of a gauge shield assembly mounting brace in accordance with the present invention; and, FIGS. 8A and 8B are perspective and partial perspective views, respectively, illustrating a second embodiment of a gauge shield in accordance with the present invention.

As may be seen with reference to FIGS. 2A and 6, to prevent radial expansion of the shield 14 upon threaded attachment of the end cap 30 or nipple 40, first and second like collars 50, 52 are positioned around the shield 14 at the ends 22, 24, respectively. Preferably, the inner surface 54 of each collar 50, 52 includes portions that closely mate with the ends 22, 24 of the shield 14, respectively, to permit easy attachment of the collar to the shield 14. Also, those skilled in the art will recognize that the collar 52 and the nipple 40 can alternatively be provided together, formed as a one-piece construction.

At least one urn attachment brace 60 is secured at a first end 62 to an urn and includes a U-shaped receiving channel 64 that receives the shield 14 in a snap or friction fit to connect the shield 14 to the urn.

Figure 8A:
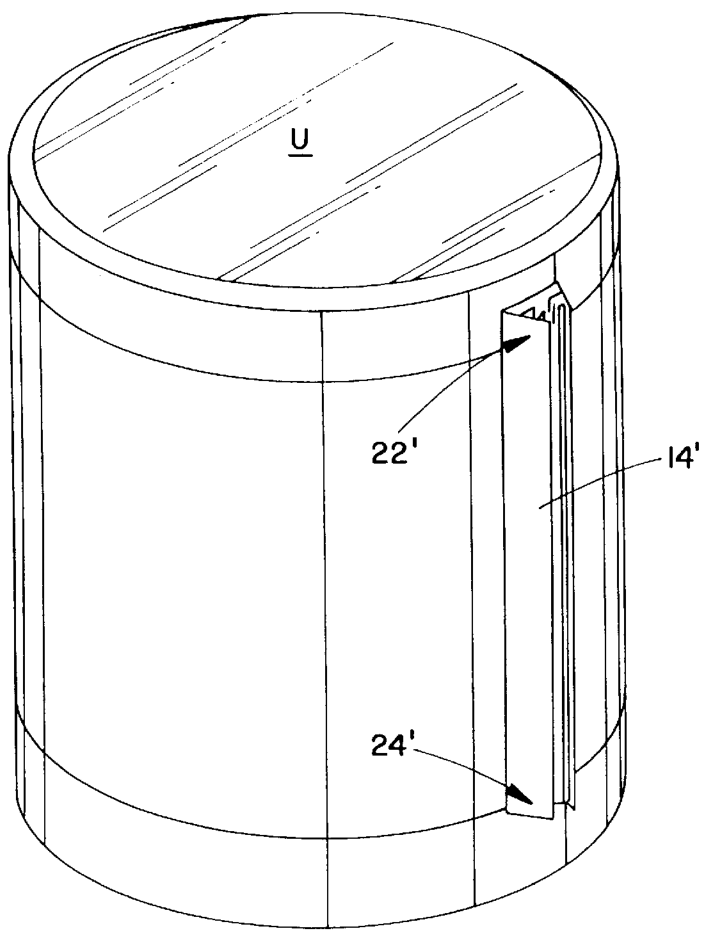
Figure 8B:
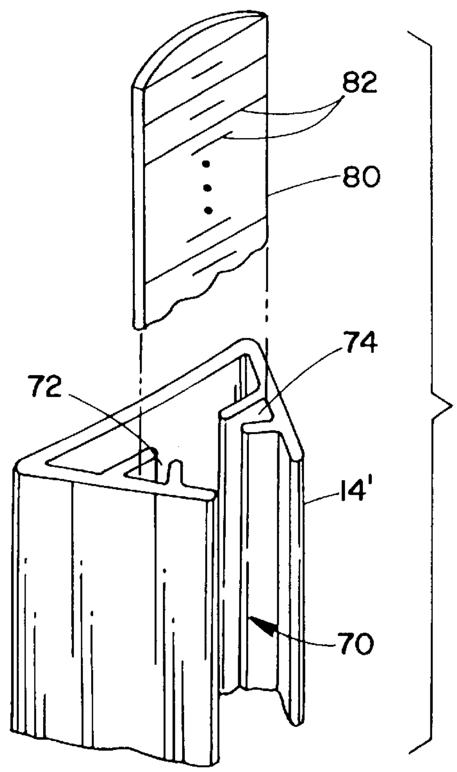

FIGS. 8A and 8B illustrate a second embodiment of a gauge shield 14' in accordance with a second embodiment of the present invention. The shield 14' is provided by an elongated extruded plastic (e.g., ABS plastic) or aluminum member having an open sight gauge receiving channel 70 that permits sight gauge viewing. The shield 14' is attached to an urn U by a suitable brace or other means as shown in FIG. 8A. The shield 14' preferably includes or defines optional internally opposed slots 72,74 that slidably receive a graduated card 80, including volume indicator marks 82, behind a sight gauge received in the channel 70 to facilitate easy and accurate reading of the gauge. Also, the card 80 may be provided with a white or other high contrast surface to facilitate gauge reading. The slots 72,74 also preferably engage pins on an end cap (not shown) that is simply press-fit into engagement therewith.

The invention has been described with reference to preferred embodiments. Of course, modifications and alterations will occur to others upon reading and understanding the preceding specification. It is intended that the invention be construed as including all such modifications and alterations insofar as they fall within the scope of the following claims.

Having thus described the preferred embodiments, what is claimed is:

1. A method of forming a sight gauge shield assembly for attachment to an urn, said method comprising:

extruding a member having a first axial end, a second axial end located opposite said first axial end, and a continuous recess defined therein, said recess defined by an inner surface terminated by axially extending first and second edges, respectively, so that an open viewing region is defined in said extruded member from and through first and second opposite axial ends of said member between said first and second edges;

placing a sight gauge in said recess;

securing an end cap to the first end of the extruded member; and, securing a faucet attachment nipple to the second end of the extruded member.

* * * * *